United States Patent
Dziurda et al.

(10) Patent No.: US 8,919,517 B2
(45) Date of Patent: Dec. 30, 2014

(54) CLUTCH PLATE CONFIGURATION AND METHOD

(75) Inventors: Robert Alan Dziurda, Waterford, MI (US); Charles S. Davis, Livonia, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 369 days.

(21) Appl. No.: 13/433,933

(22) Filed: Mar. 29, 2012

(65) Prior Publication Data

US 2012/0181136 A1  Jul. 19, 2012

Related U.S. Application Data

(63) Continuation-in-part of application No. 12/967,837, filed on Dec. 14, 2010.

(51) Int. Cl.
| | |
|---|---|
| *F16D 13/52* | (2006.01) |
| *F16D 13/64* | (2006.01) |
| *B23P 11/00* | (2006.01) |
| *F16D 13/68* | (2006.01) |
| *F16D 69/00* | (2006.01) |

(52) U.S. Cl.
CPC ............ *F16D 13/683* (2013.01); *F16D 13/646* (2013.01); *F16D 2069/004* (2013.01); *F16D 2069/005* (2013.01)

USPC .......................... 192/70.2; 219/91.2; 29/428

(58) Field of Classification Search
USPC ...................... 192/70.11, 70.14, 70.2, 107 C; 219/91.2; 29/428
See application file for complete search history.

(56) References Cited

U.S. PATENT DOCUMENTS

| | | | | |
|---|---|---|---|---|
| 6,419,065 | B1 * | 7/2002 | Mieda | ........................ 192/70.2 |
| 8,109,374 | B2 | 2/2012 | Ando | |
| 2011/0067971 | A1 * | 3/2011 | Ratner | ........................ 192/70.2 |

* cited by examiner

*Primary Examiner* — Jacob S Scott

(57) ABSTRACT

An annular core plate for a multiplate clutch assembly includes a main annular portion and an engagement annular portion extending from the main annular portion. The engagement annular portion has teeth extending therefrom. The teeth are thicker than the main annular portion. A multiplate clutch assembly is provided that includes at least one annular core plate or friction plate and at least one annular separator plate. A method of constructing at least one plate for a multiplate clutch assembly is also provided. The method includes forming an annular separator plate from sheet metal by removing a circular section from a separator plate main body portion of the sheet metal, removing a portion of the circular section to form teeth in the circular section, and attaching the circular section to an annular plate.

17 Claims, 10 Drawing Sheets

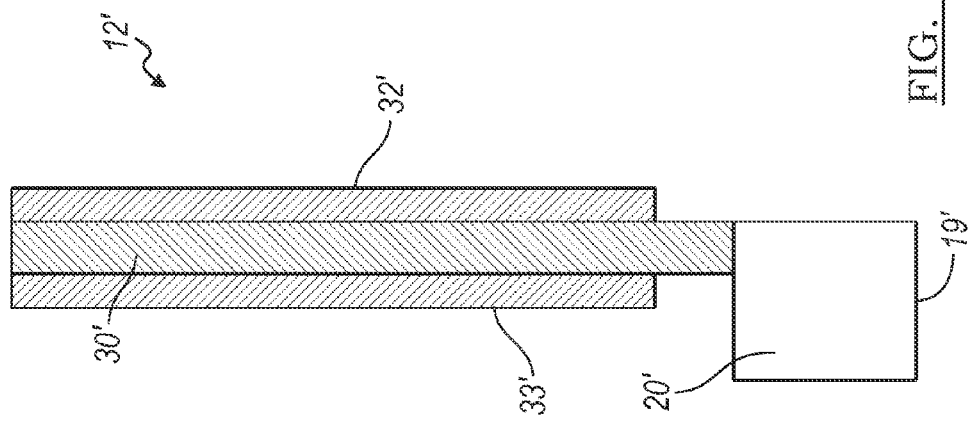
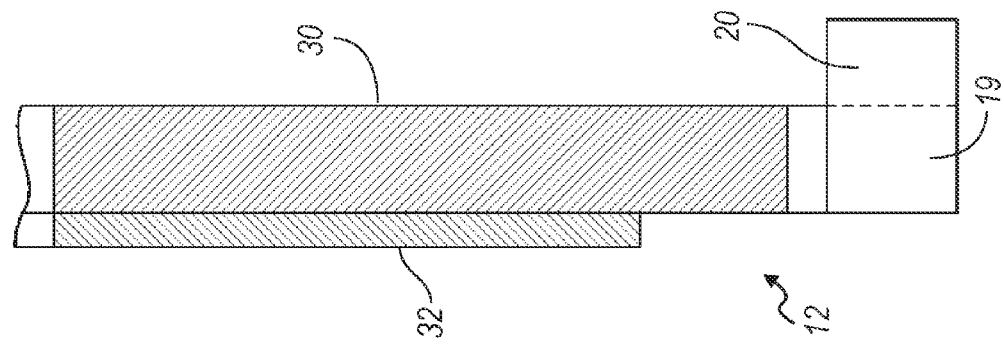

CLUTCH PLATE CONFIGURATION AND METHOD

CROSS-REFERENCE TO RELATED APPLICATIONS

This application is a continuation-in-part of U.S. patent application Ser. No. 12/967,837, filed on Dec. 14, 2010, which is herein incorporated by reference in its entirety.

FIELD

The present disclosure relates to a clutch assembly and a method. More specifically, the present disclosure relates to a configuration of a plate for a clutch assembly and a method for creating the clutch plate.

BACKGROUND

The statements in this section merely provide background information related to the present disclosure and may not constitute prior art.

A typical motor vehicle automatic transmission includes gear elements and multiplate clutches that are selectably engageable to establish one of several forward speed ratios between the transmission input and output shafts. The input shaft is coupled to the vehicle engine through a fluid coupling such as a torque converter, and the output shaft is coupled to the vehicle drive wheels through a differential gear set.

A multiplate clutch generally includes a set of friction plates, a set of separator (or reaction) plates, and a hub, all of which are housed in a clutch case. Spline grooves in the clutch case engage with splines along the outer periphery of either the separator plates or the friction plates. Another set of spline grooves in the hub engage with splines around the inner surfaces of either the friction plates or the separator plates, i.e., whichever of the plates are not splined to the case are splined to the hub. The separator plates and the friction plates are arranged alternately so that they can be engaged or disengaged with each other.

In general the contact area between each spline and respective spline groove results in high contact stresses. It may be desirable, however, to utilize relatively thin core plates bearing friction material to contact the separator plates, which increases the contact stresses between the splines and spline grooves. Larger core plates may increase the overall size of the transmission. In additions, costs are a constant concern.

SUMMARY

The present disclosure provides a core plate having an increased thickness in its spline region, thereby maximizing the contact area between a core plate and its spline interface, to reduce the contact stresses between the core plate and the hub or case splines. A method is provided to create core plates from material that is removed from the separator (or reaction) plates when the separator plates are formed, resulting in an added thickness to the core plate in the spline region only, while keeping additional costs low due to the use of the removed material.

In one variation, which may be combined with or separate from the other variations described herein, the present disclosure provides an annular core plate for a multiplate clutch assembly. The annular core plate includes a main annular portion having a first outer surface and an opposed second outer surface. The first and second outer surfaces define a first thickness therebetween. The annular core plate also includes an engagement annular portion extending from the main annular portion. The engagement annular portion has teeth extending therefrom. Each tooth has a first tooth surface and an opposed second tooth surface defining a second thickness therebetween. The second thickness is greater than the first thickness.

In another form, which may be combined with or separate from the other forms described herein, the present disclosure provides a multiplate clutch assembly that includes at least one annular separator plate and at least one annular friction plate. The friction plate includes a main annular portion having an outer surface with friction material disposed on the outer surface. The friction plate further includes an engagement annular portion extending from the main annular portion. The engagement annular portion has teeth extending therefrom. The main annular portion has a first thickness and the teeth have a second thickness. The second thickness is greater than the first thickness.

In yet another form, which may be combined with or separate from the other forms described herein, the present disclosure provides a method of constructing at least one plate for a multiplate clutch assembly. The method includes forming an annular separator plate from sheet metal by removing a circular section from a separator plate main body portion of the sheet metal. The method also includes removing a portion of the circular section to form teeth in the circular section and attaching the circular section to an annular plate.

Further features, advantages, and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, emphasis instead being placed upon illustrating the principles of the invention. Moreover, like reference characters designate corresponding parts throughout the different views. In the drawings:

FIG. 4 is a side cross-sectional view of a single-sided friction plate assembly in accordance with the principles of the present invention;

FIG. 5 is a side cross-sectional view of double-sided friction plate assembly in a accordance with the principles of the present invention;

DETAILED DESCRIPTION

The following description is merely exemplary in nature and is not intended to limit the present disclosure, application, or uses.

Figure 1:
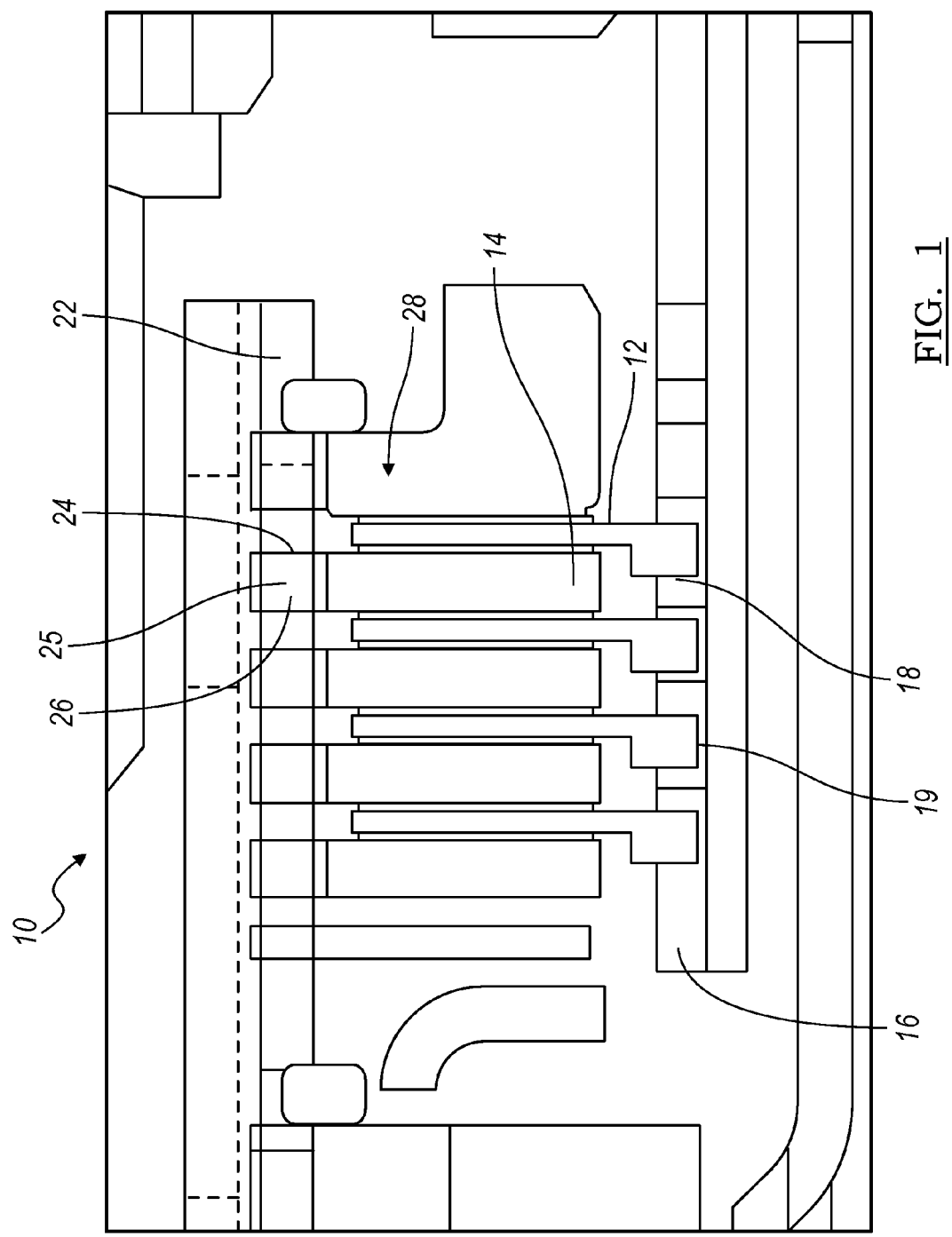
FIG. 1 is a schematic cross sectional view of a portion of a clutch assembly with a set of friction plate assemblies in accordance with the principles of the invention.
Figure 2A:
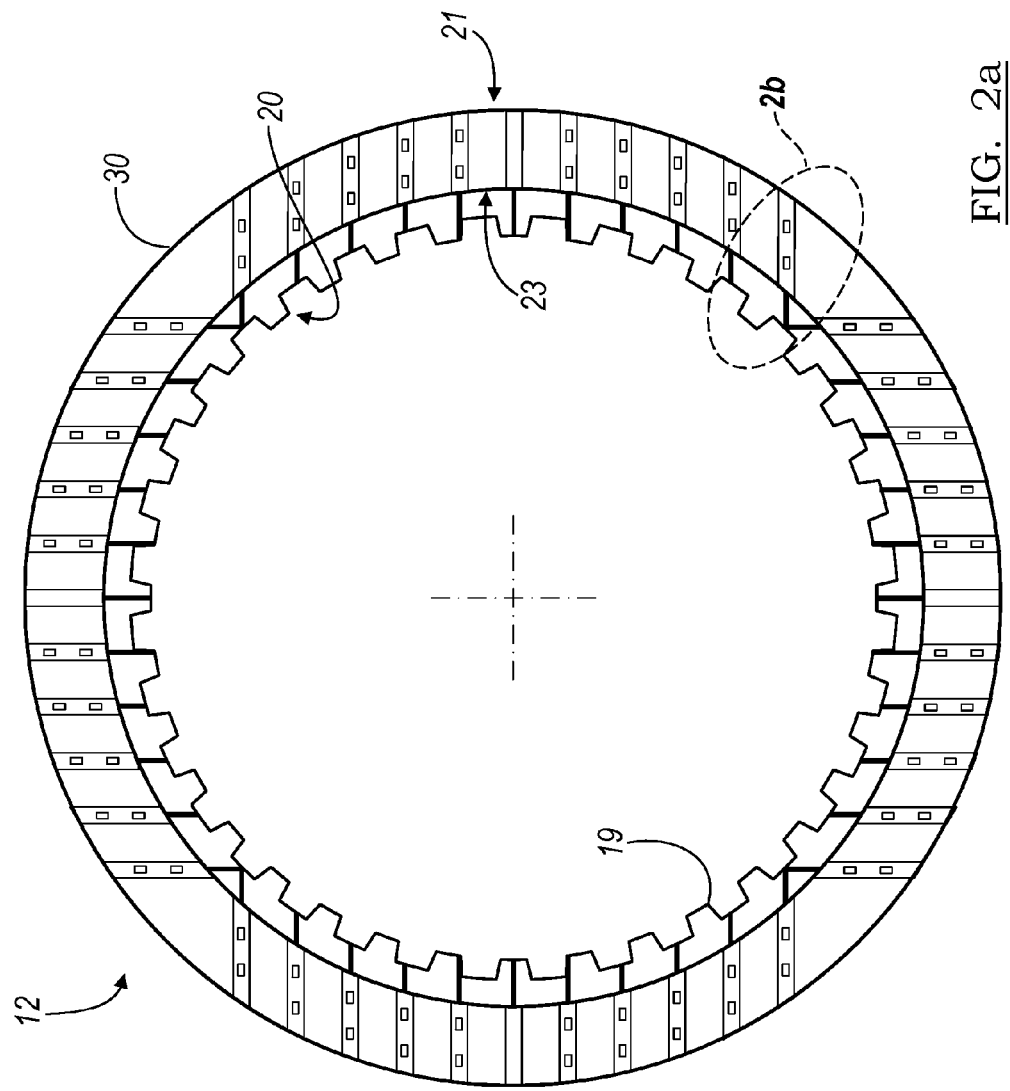
FIG. 2a is a front view of a core plate of the friction plate assemblies of FIG. 1, according to the principles of the present invention.

Referring now to FIGS. 1 and 2a, a clutch assembly embodying the principles of the present invention is illustrated therein and designated at 10. As its primary components, the clutch assembly 10 includes a set of annular shaped friction plates 12, each with an outer surface 21 and an inner surface 23, and a set of annular shaped separator plates 14 arranged alternately with the set of friction plates 12. The clutch assembly 10 further includes an inner member such as a hub 16 with a plurality of spline grooves 18, each of which selectively engages with a set of teeth 19 of a spline 20 associated with each friction plate 12 and an outer member such as a clutch case 22 with a plurality of spline grooves 24, each of which selectively engages with a set of teeth 25 of a spline 26 associated with each separator plate 14. To engage the clutch assembly 10, a piston head presses the separator plates 14 and the friction plates 12 together against a backing plate 28.

Figure 2C:
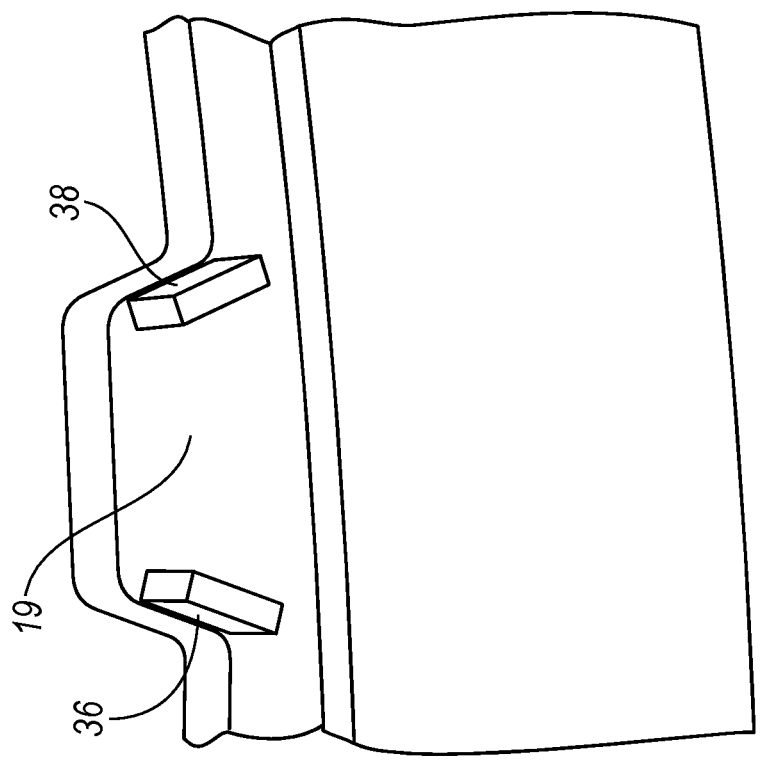
FIG. 2c is a close-up view of a single spline in accordance with another embodiment of the present invention.
Figure 2B:
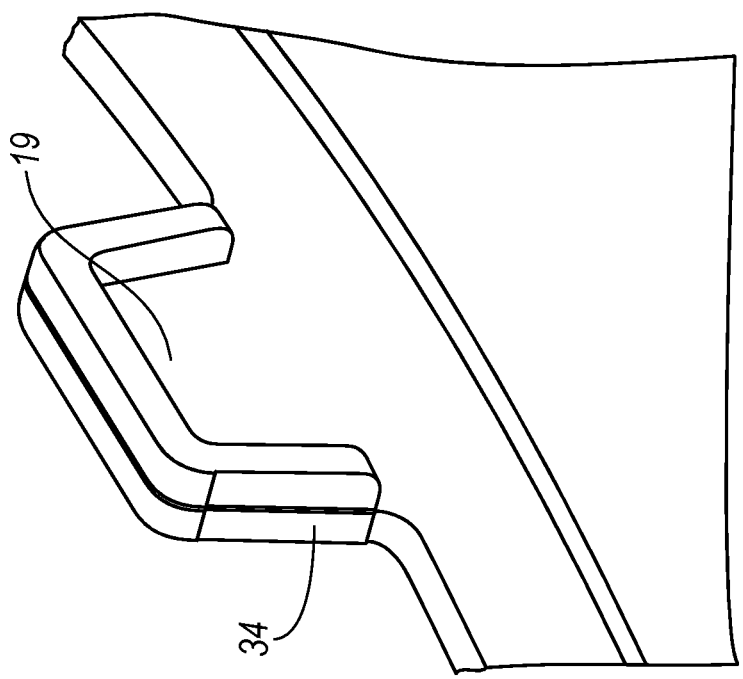
FIG. 2b is a close-up view of a single spline of the core plate in the region 2b of FIG. 2a, in accordance with the principles of the present invention.

Referring further to FIG. 4, each friction plate 12 includes a core plate 30 and a layer of friction material 32. Each tooth 19 of the spline 20 can be fully extruded as shown in FIG. 2b. That is, the edges of each spline tooth are drawn into a C-section 34. Alternatively, each tooth of the spline 20 can be partially extruded; that is, each tooth is drawn with two side edges 36 and 38 as shown in FIG. 2c.

In another implementation as shown in FIG. 5, a friction plate 12' includes a core plate 30' and two layers of friction material 32' and 33'. The spline 20' associated the friction plate 12' includes teeth 19'. The teeth 19' may be fully extruded similar to the teeth 19 shown in FIG. 2b or may be partially extruded like the teeth 19 shown in FIG. 2c.

In alternative applications, a friction plate 12" includes an outer surface 21", an inner surface 23", and a spline 20" with extruded teeth 19" around the outer surface 21".

Figure 3:
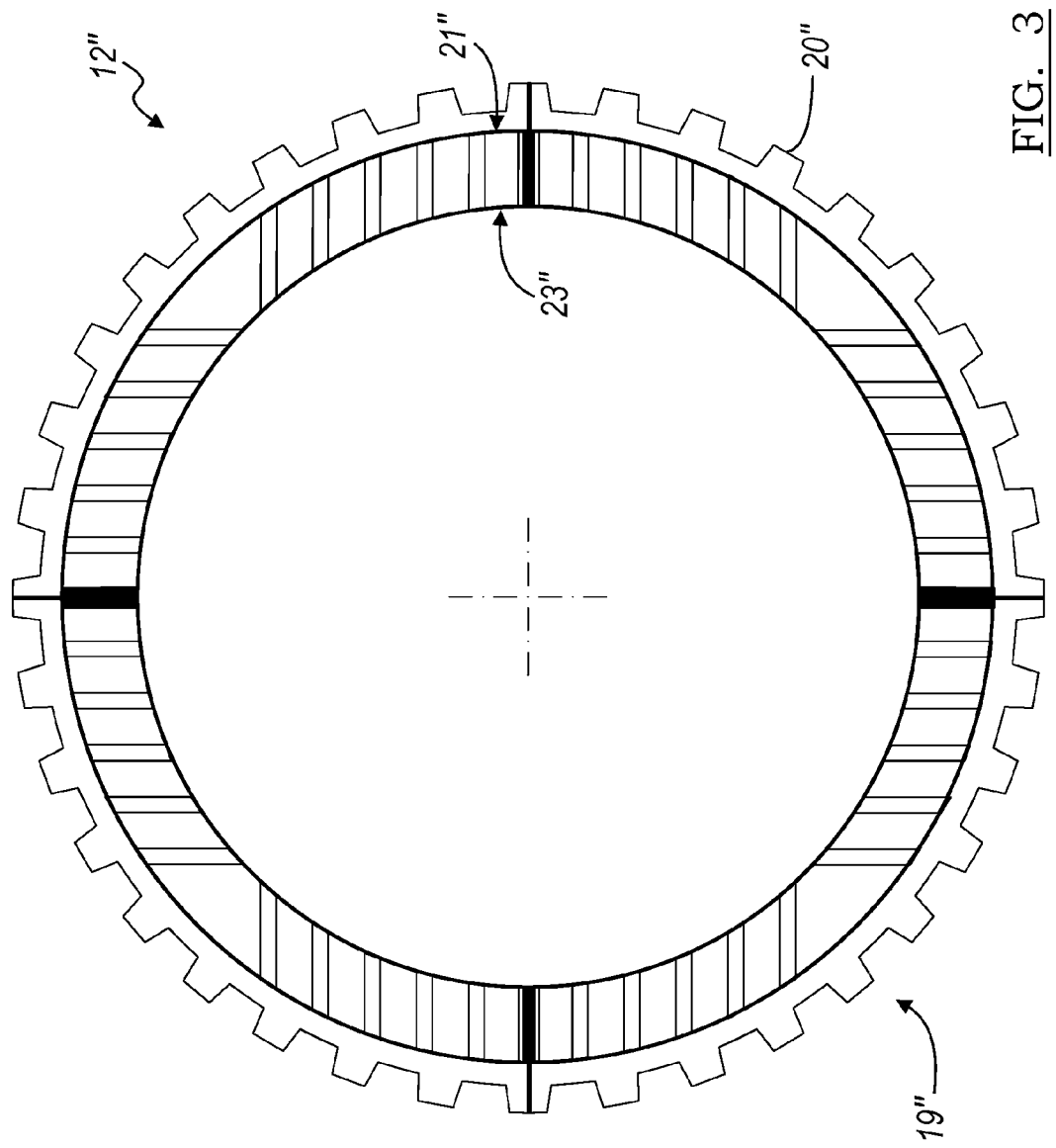
FIG. 3 is a front view of a core plate of a friction plate assembly in accordance with another embodiment of the present invention.

In yet other applications, the separator plate 14 may also include a core plate with an inner spline similar to the core plate shown in FIG. 2a or an outer spline similar to the core plate shown in FIG. 3. Accordingly, depending upon the application of the clutch assembly 10, the clutch assembly may include a friction plate with an inner splined core plate such and a separator plate with a core plate with an outer spline as depicted in FIG. 1. The splines associated with either or both of the core plates of the separator plates and the core plates of the friction plates can be extruded. The extruded splines may be partially or fully extruded. In other applications, the friction plate includes a core plate with an outer spline while the separator plate includes a core plate with an inner spline. Again, one of both splines associated with the friction plate and the separator plate may be partially or fully extruded.

In typical clutch assemblies, the hub 16 is made of steel. However, if extruded splines are employed, the contact area between the teeth of the splines and the spline groove in the hub increases and thereby decreases the contact stress between the hub and the teeth of the spline as compared to splines that are not extruded. Accordingly, with decreased contact stresses, a material softer than steel can be employed for the hub, such as, for example, aluminum. Alternatively, the hub can be steel, but the increased contact area associated with an extruded spline allows for the use of a thinner core plate. Hence, the mass is reduced, resulting in a cost reduction in the manufacturing of such core plates. In such arrangements, the separator plate can be thicker than a conventional separator plate to allow for a greater heat sink such that higher energy can run through the clutch assembly that occupies the same space, or, alternatively, more friction plates may be employed in the same space.

To make the teeth 19 or 19" on the splines, each core plate associated with a friction plate or separator plate is initially stamped or fine blanked. Then the edges of the teeth are coined or drawn to form the extruded spline. That is, the outer edge of each tooth is folded down to form a fully extruded tooth as shown in FIG. 2b, or the two side edges are folded down to form a partially extruded tooth as shown in FIG. 2c. Alternatively, the extrusion of the teeth can be formed in a single die/fine blank process or in a progressive die process.

In sum, the use of friction plates with an extruded spline allows for reduced mass, greater choice in mating component materials, increased axial packaging flexibility, and allows greater clutch energy capacity that results from thinner friction core plates and thicker separator plates.

Depending on the application, certain teeth of a spline associated with either the separator plate or the friction plate may not be extruded. That is, for a particular inner or outer spline, some teeth may be extruded while others are not.

Figure 6:
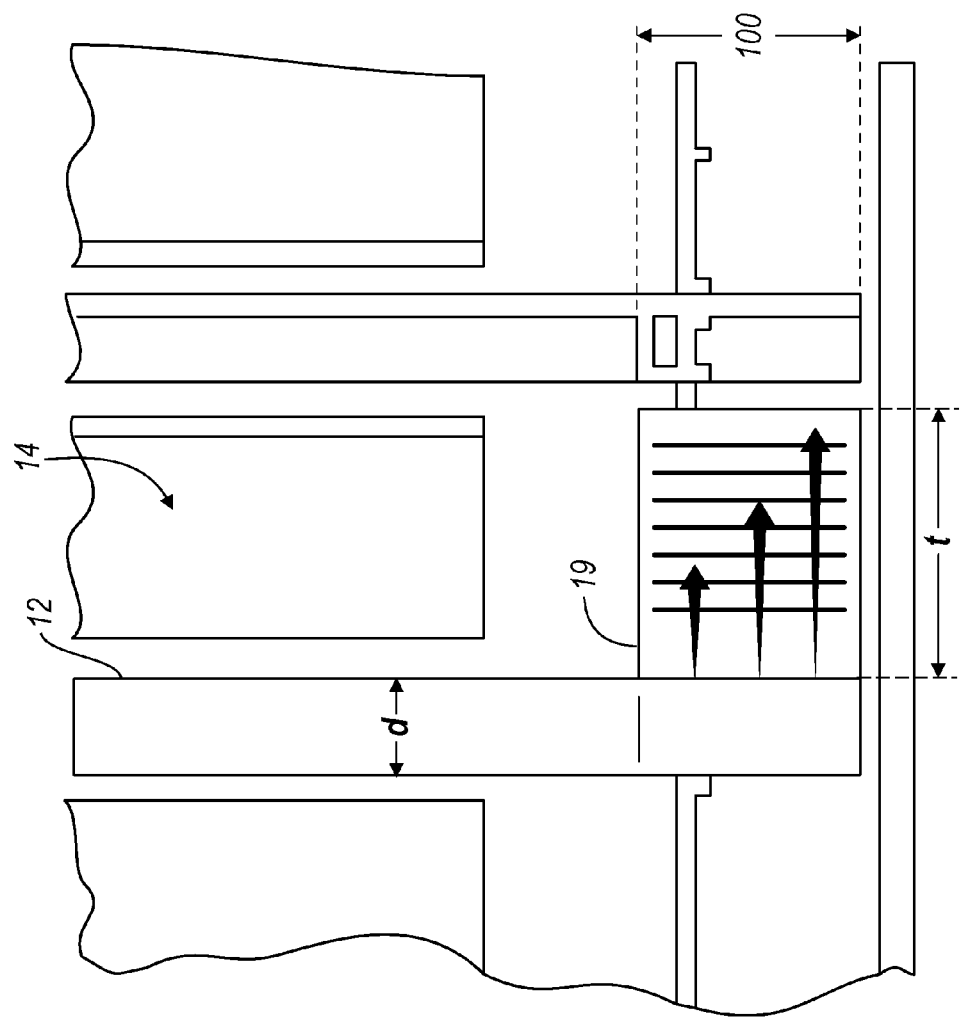
FIG. 6 is a schematic cross-sectional view of a friction plate assembly and separator plate, illustrating the extent of the extrusion depth of a splined core plate, in accordance with the principles of the present invention.

Referring to FIG. 6, note that in the spline contact area 100, the thickness, t, of the teeth 19 of a splined friction plate 12 can range from the core plate thickness, d, (that is, no extrusion) to the full thickness of the separator plate 14, t+d, where t is the thickness of the extruded portion of the teeth 19, depending on the desired performance and capability of the clutch assembly 10.

Figure 7:
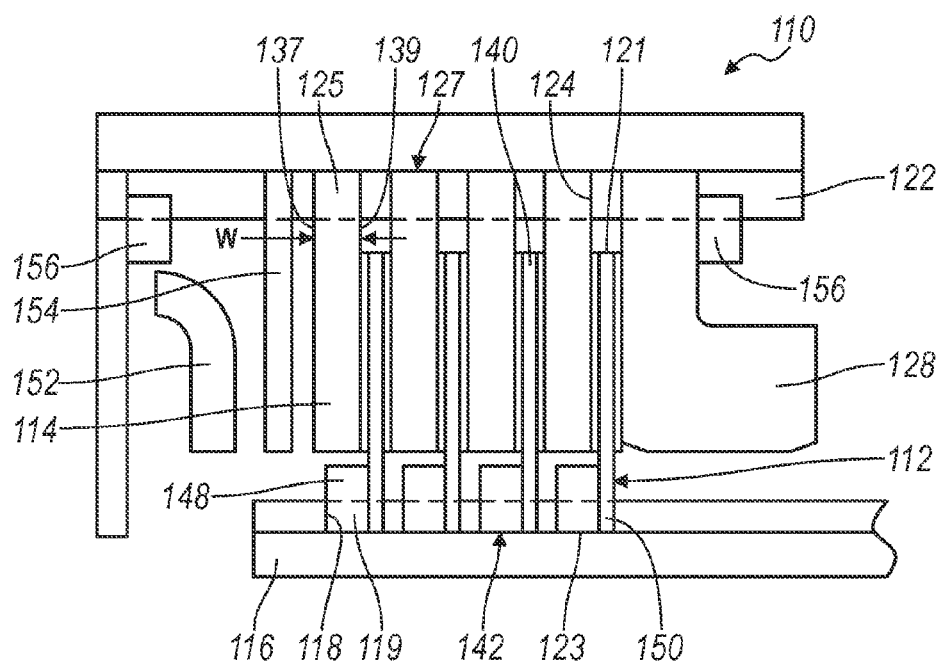
FIG. 7 is a schematic cross-sectional view of another variation of a portion of a clutch assembly with a set of friction plate assemblies in accordance with the principles of the invention.
Figure 8A:
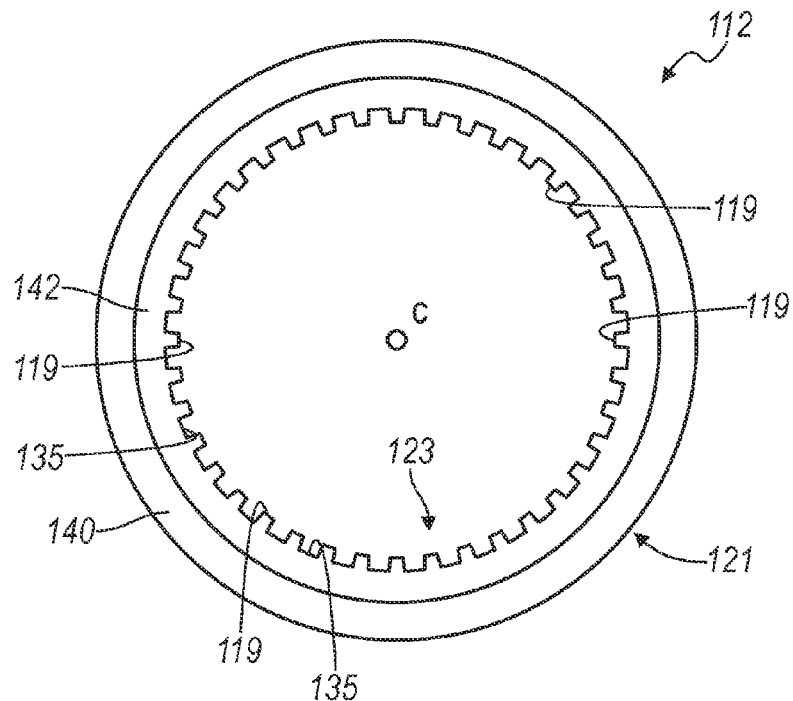
FIG. 8a is a front view of a friction plate of the friction plate assemblies of FIG. 7, according to the principles of the present invention.
Figure 8B:
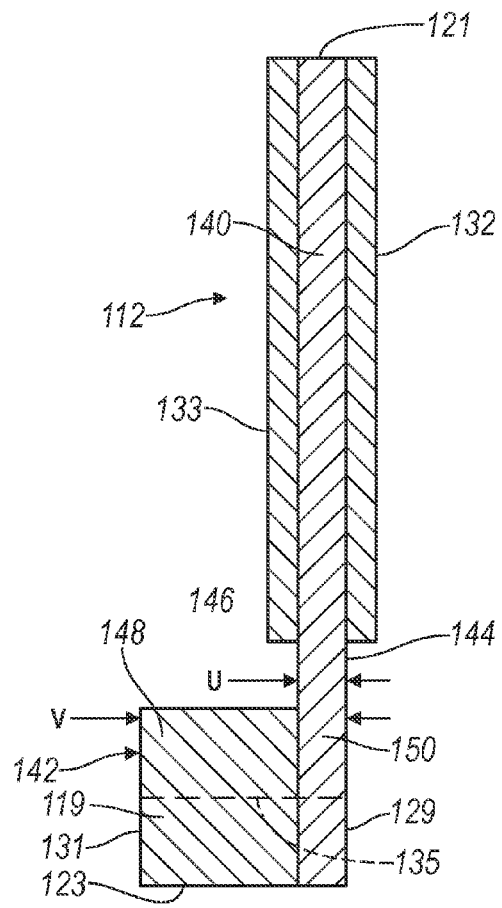
FIG. 8b is a side cross-sectional view of a variety of the friction plate of FIG. 8a in accordance with the principles of the present invention.

Referring now to FIGS. 7 and 8a-8b, a clutch assembly embodying the principles of the present invention is illustrated therein and designated at 110. Similar to the clutch assembly 10 described above, the clutch assembly 110 includes a set of annular-shaped core plates or friction plates 112, each with an outer edge 121 and an inner edge 123, and a set of annular-shaped reaction plates or separator plates 114 arranged alternately with the set of friction plates 112.

Each friction plate 112 has a main annular portion 140 and an engagement annular portion 142 extending from and surrounding the main annular portion 140. The main annular portion 140 is a plate that has a first outer surface 144 and an opposed second outer surface 146. The first and second outer surfaces define a first thickness U therebetween.

The engagement annular portion 142 has a plurality of teeth 119 extending inwardly from the inner edge 123 of the engagement annular portion 142 toward the center axis C of the main annular portion 140. Between each tooth 119 is a groove 135. Each tooth 119 has a first tooth surface 129 and an opposed second tooth surface 131. The first and second tooth surfaces define a second thickness V therebetween.

Friction material 132 is disposed on the first outer surface 144 of the main annular portion 140, and friction material 133 is disposed on the second outer surface 146 of the main annular portion 140. The friction material 132, 133 may be made of any suitable material, such as, for example, a ceramic material or a copper-faced material. Friction material may be disposed on only a single side, for example, on one, but not both, of the outer surfaces 144, 146, in other embodiments.

The engagement annular portion 142 has a thickness bolstering portion 148 and a base portion 150. Both the thickness bolstering portion and the base portion 150 may have a generally annular shape. The thickness bolstering portion 148 may be attached to the base portion 150 by welding, such as spot welding, staking, adhesive, or by any other suitable mechanical connection. In other variations, the thickness bolstering portion 148 may be unitarily formed as one-piece with the base portion 150, without falling beyond the spirit and scope of the present invention. In still other variations, the thickness bolstering portion 148 may be formed by extruding the base portion 150, as described above. The thickness bolstering portion 148 may alternatively have any other suitable configuration to bolster the thickness of the teeth 119.

The second thickness V, which includes the material between the first and second tooth surfaces 129, 131, is greater than the first thickness U, which includes the material between the first and second outer surfaces 144, 146 of the main annular portion 140. For example, the second thickness V may be twice, three times, four times, five times, six times, seven times, or eight times the first thickness U, or any integer or non-integer multiplier of the first thickness U, by way of example. For example, the main annular portion 140 and the base portion 150 could have a thickness of about 0.7 mm, while the thickness bolstering portion 148 could have a thickness of about 2.2 mm. As a result, the engagement annular portion 142 of the friction plate 112 is thicker than the main annular portion 140, upon which the friction material 132, 133 is disposed.

The reaction plates or separator plates 114 have a plurality of teeth 125, separated by valleys, disposed around the outer periphery 127 of the separator plates 114. The teeth 125 may be formed unitarily as one-piece with the annular portion of the separator plates 114, if desired. Each separator plate 114 has a thickness W, which is defined as the thickness of the material between first and second surfaces 137, 139 of the separator plate 114. In some variations, the thickness bolstering portion 148 has a thickness V-U that is about, or approximately, equal to the thickness W of each separator plate 114. This is because the separator plate 114 and the thickness bolstering portion 148 may be formed from the same original piece of sheet metal, which will be described in further detail below. In some variations, the separator plates 114 and the thickness bolstering portions 148 may each have a thickness of about 1.5 mm.

The clutch assembly 110 further includes an inner member, such as a hub 116, bearing a plurality of spline grooves 118. The separator plates 114 and the friction plates 112 are interleaved with each other about the hub 116. In other words, the annular separator plates 114 and friction plates 112 completely surround the hub 116, and they are disposed in alternate order, which each friction plate 112 disposed directly adjacent to a separator plate 114. In this embodiment, the spline grooves 118 of the hub 116 engage the teeth 119 associated with each friction plate 112.

The clutch assembly also includes an outer member, such as a clutch case 122, which has a plurality of spline grooves 124, each of which engages the set of teeth 125 associated with each separator plate 114. The separator plates 114, the friction plates 112, and the hub 116 are disposed within the clutch case 122.

To engage the clutch assembly 110, a piston head 152 presses the separator plates 114 and the friction plates 112 together against a backing plate 128. In some embodiments, a wave plate 154 or other apply plate may be disposed between the piston head 152 and separator/friction plates 114, 112. One or more snap rings 156 may hold the clutch assembly 110 in place within a transmission housing.

In yet other applications, the separator plate 114 may also include a core plate with an inner spline similar to the core plate shown in FIGS. 8a-8b. In other applications, the friction plate 112 includes a core plate with an outer spline while the separator plate 114 includes a core plate with an inner spline. For example, referring now to FIG. 9, the clutch assembly 110' is shown with the variation wherein each friction plate 112' has its plurality of teeth 119' disposed around its outer periphery (instead of along the inner periphery as in FIG. 8). The teeth 119' extend outwardly from the outer edge 121' of the engagement annular portion 142' of the friction plate 112. The separator plates 114' have teeth 125' disposed along an inner edge 126' of the separator plates 114'. Accordingly, the teeth 119' of the friction plates 119' engage a spline 124' formed in the case 122', and the teeth 125' of the separator plates 114' engage a spline 118' formed in the hub 116'. The thickness bolstering portion 148' is attached along the outer edge 121' of the friction plates 112' to bolster the thickness of the teeth 119', as described above with respect to the teeth 119 of FIGS. 7, 8a, and 8b. The rest of the description with regard to FIGS. 7, 8a, and 8b applies to the embodiment of FIG. 9 to the extent not contradicted in this paragraph and by FIG. 9. For example, the friction plates 112' having friction material 132, 133 disposed thereon.

The friction plates 112, 112', the separator plates 114, 114', the clutch hubs 116, 116', and the cases 122, 122' may be constructed of steel. Reducing the contact stresses between the friction plates 112, 112' and their spline interfaces could allow the use of softer materials, such as aluminum, for the clutch hubs 116, 116' and cases 122, 122'.

Figure 10A:
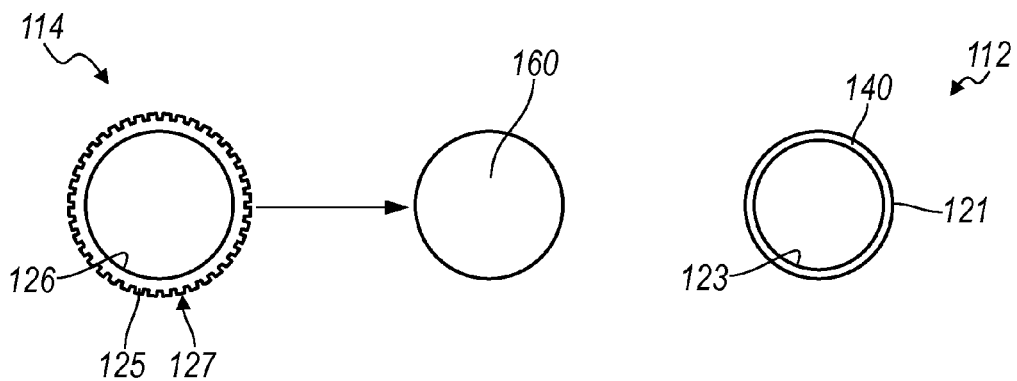
FIG. 10A is an illustration of a portion of a method of constructing plates of a clutch assembly in accordance with the principles of the present invention.

Each core plate associated with a friction plate 112, 112' or separator plate 114, 114' may be initially stamped or fine blanked, or they may be formed in any other suitable manner. Referring to FIG. 10A, the separator plate 114 and the main annular portion 140 of the friction plate 112 are shown after having been initially stamped or fine blanked. The main annular portion 140 is initially stamped as an annulus having smooth inner and outer edges 123, 121, in this embodiment. The separator plate 114 is stamped or fine blanked having a smooth inner edge 126 and a toothed outer edge 127, having teeth 125 formed along the outer edge 127 of the separator plate 114. The off-fall from the forming of the separator plate 114 is a center circular section 160.

Figure 10B:
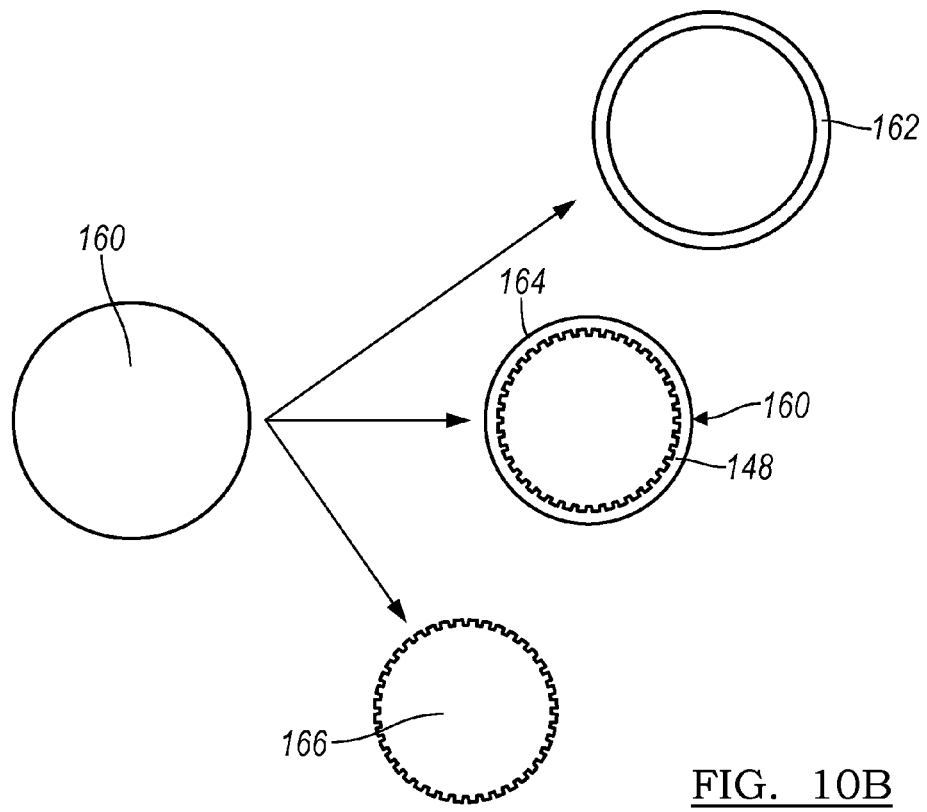
FIG. 10B is an illustration of another portion of the method of FIG. 10A, in accordance with the principles of the present invention.

Referring now to FIG. 10B, the center circular section 160 is further cut (by stamping or another method) to form three portions. The outermost portion 162 of the center circular section 160, which is an annulus having smooth inner and outer edges, is removed from the center circular section 160 and discarded as scrap. The outermost portion 162 is removed to reduce the diameter of the center circular section 160. This step, however, can be omitted, if desired.

The middle portion 164 of the center circular section 160 is the part that will become the thickness bolstering portion 148 of the friction plate 112. An inner-most portion 166 is cut (by stamping or another method) from the middle portion 164 of the center circular section 160 and discarded as scrap. The inner-most portion 166 is cut to form a toothed configuration along its outer periphery, resulting in a set of teeth 119 being formed along the inner edge 123 of the thickness bolstering portion 148.

Figure 10C:
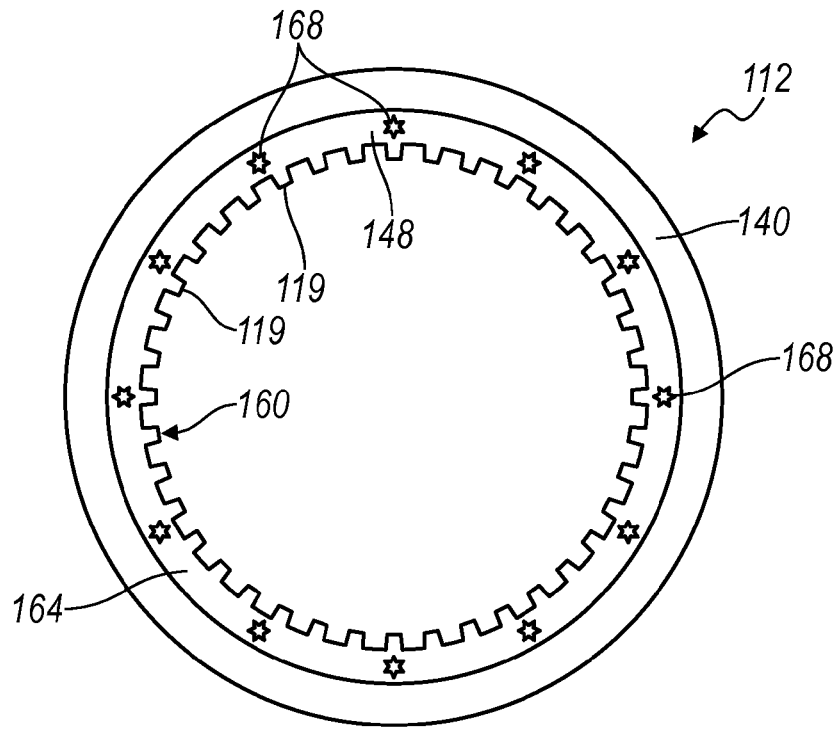
FIG. 10C is an illustration of yet another portion of the method of FIGS. 10A-10B, according to the principles of the present invention.
Figure 10D:
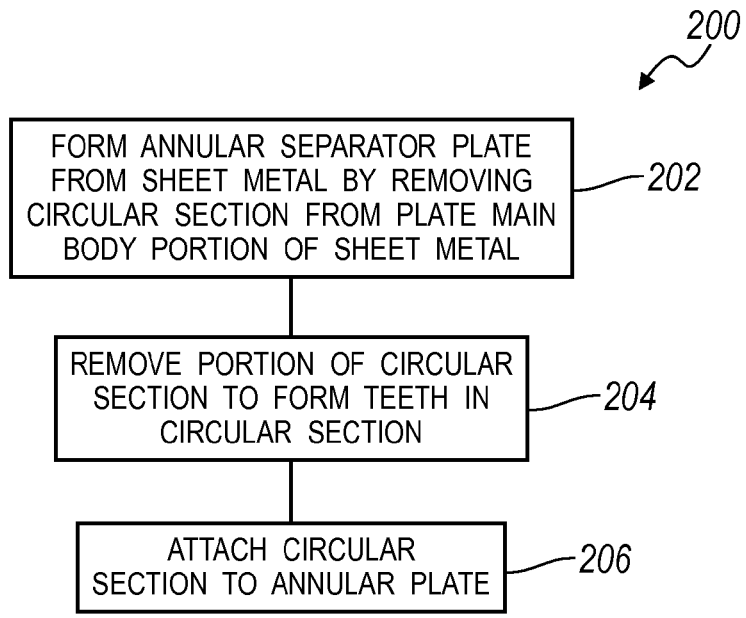
FIG. 10D is a block diagram illustrating a method of constructing plates of a clutch assembly in accordance with the principles of the present invention.

Referring now to FIG. 10C, the middle portion 164 of the center circular section 160, which has been formed into the thickness bolstering portion 148 of FIGS. 7, 8a, and 8b, is attached to the main annular body 140 of the friction plate 112. The thickness bolstering portion 148 may be attached to the main annular body 140 by spot welding at spot welded attachment points 168. In the alternative, the thickness bolstering portion 148 may be attached to the main annular body 140 by welding along an annular seam, by staking, by adhesive, by another mechanical attachment, or by any other suitable method. Accordingly, the thickness bolstering portion 148 is formed by off-fall from the forming of the separator plate 114, which otherwise would have been discarded as scrap.

Thus, the present disclosure includes a method 200 of constructing at least one plate for a multiplate clutch assembly, as illustrated in FIGS. 10A-10D. The method 200 includes a step 202 of forming an annular separator plate 114 from sheet metal by removing a circular section 160 from a separator plate main body portion of the sheet metal. This forming step 202 may include stamping the sheet metal to cut out the circular section 160 from the center of the separator plate main body portion.

The method further includes a step 204 of removing a portion of the circular section 160 to form a plurality of teeth 119 in the circular section 160. This removing step 204 may include removing an inner portion 166 of the circular section 160 to form the circular section 160 into an annulus having the plurality of teeth 119 extending inwardly from an inner edge 123 of the circular section 160.

The method 200 includes a step 206 of attaching the circular section 160 to an annular plate 140. The attaching step 206 may include welding the circular section 160 to the annular plate 140.

The method 200 may also include the optional step of removing an outer annular portion 162 of the circular section 160 to reduce the diameter of the circular section 160. The method 200 may further include the step of attaching friction material 132, 133 to the annular plate 140. Further yet, the method 200 may include forming a plurality of separator teeth 125 in the separator plate 114 main body portion by removing material from an outer periphery 127 of the separator plate 114 main body portion.

Figure 9:
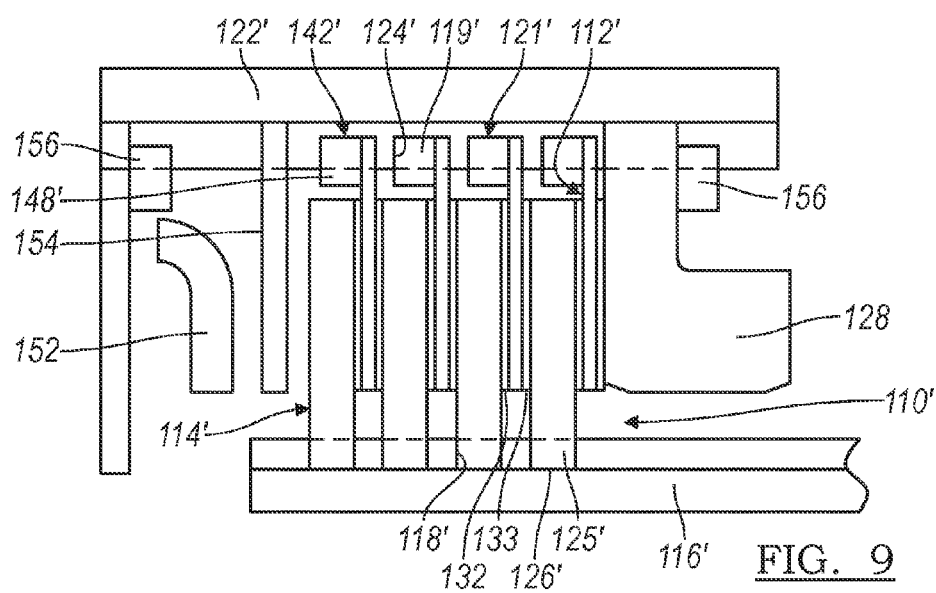
FIG. 9 is a schematic cross-sectional view of yet another variation of a portion of a clutch assembly with a set of friction plate assemblies in accordance with the principles of the invention.

The variation of the clutch assembly 110' of FIG. 9 may be formed similarly to the variation of the clutch assembly 110 of FIGS. 7, 8a, and 8b (illustrated in FIGS. 10A-10D). For example, the separator plate 114' and the main annular portion 140' of the friction plate 112' may be initially stamped or fine blanked and a center section 160 may be removed from the separator plate 114' main body portion. The center section 160 could be removed from an inner periphery of the separator plate 114', as illustrated in FIG. 10A, or the center section 160 could be removed from an outer periphery of the separator plate 114'. The center portion 160 may be formed into the thickness bolstering portion 148' by removing an outer portion of the circular section 160 to form teeth 119' around an outer periphery 121' of the circular section 160. In the alternative, the thickness bolstering portion 148' may be formed from a different sheet of metal. The thickness bolstering portion 148' may be further formed by removing an inner portion of the circular section 160 to form the circular section 160 into an annulus. The thickness bolstering portion 148' may be attached to the main annular portion 140' as described above with respect to FIGS. 10A-10D, such as by welding.

The elements of the disclosure may be combined together in various ways, without departing from the spirit and scope of the present invention. Further, the description of the invention is merely exemplary in nature and variations that do not depart from the gist of the invention are intended to be within the scope of the invention. Such variations are not to be regarded as a departure from the spirit and scope of the invention.

What is claimed is:

1. An annular core plate for a multiplate clutch assembly comprising:
a main annular portion having a first outer surface and an opposed second outer surface, the first and second outer surfaces defining a first thickness there between; and
an engagement annular portion extending from the main annular portion, the engagement annular portion comprising a plurality of teeth extending therefrom, each tooth of the plurality of teeth having a first tooth surface and an opposed second tooth surface, the first and second tooth surfaces defining a second thickness there between, the second thickness being greater than the first thickness, wherein the engagement annular portion has an annular thickness bolstering portion and an annular base portion, the thickness bolstering portion being attached to the base portion and the thickness bolstering portion has a thickness that is about equal to the thickness of a separator plate associated with the clutch.

2. The annular core plate of claim 1, wherein the plurality of teeth extend inwardly from an inner edge of the engagement annular portion.

3. The annular core plate of claim 1, wherein the plurality of teeth extend outwardly from an outer edge of the engagement annular portion.

4. The annular core plate of claim 1 further comprising friction material disposed on the main annular portion.

5. The annular core plate of claim 4, wherein the friction material is disposed on the first and second outer surfaces of the main annular portion.

6. A multiplate clutch assembly comprising:
at least one annular separator plate; and
at least one annular friction plate, the friction plate comprising a main annular portion having a first outer surface and a second outer surface, the first and second outer surfaces defining a first thickness there between, at least one of the first and second outer surfaces having friction material disposed thereon, the friction plate further comprising an engagement annular portion extending from the main annular portion, the engagement annular portion comprising a plurality of teeth extending therefrom, each tooth of the plurality of teeth having a first tooth surface and a second tooth surface, the first and second tooth surfaces defining a second thickness there between, the second thickness being greater than the first thickness, wherein the engagement annular portion has an annular thickness bolstering portion and an annular base portion, the thickness bolstering portion being attached to the base portion and the thickness bolstering portion has a thickness that is about equal to the thickness of the annular separator plate.

7. The multiplate clutch assembly of claim 6 further comprising an inner member, an outer member, and portions forming a plurality of spline grooves in at least one of the inner and outer members, the at least one separator plate being a plurality of separator plates, the at least one friction plate being a plurality of friction plates, the plurality of separator plates and the plurality of friction plates being interleaved with each other about the inner member, the plurality of separator plates, the plurality of friction plates, and the inner member being disposed radially inside the outer member, wherein the plurality of teeth of each friction plate of the plurality of friction plates engages the plurality of spline grooves.

8. The multiplate clutch assembly of claim 7, wherein the plurality of teeth of the plurality of friction plates extends inwardly from an inner edge of each of the main annular portions, the portions forming the plurality of spline grooves being part of the inner member, each separator plate of the plurality of separator plates comprising a plurality of separator teeth that engage a spline formed in an inner surface of the outer member.

9. A method of constructing at least one plate for a multi-plate clutch assembly, the method comprising:
   forming an annular separator plate from sheet metal by removing a circular section from a separator plate main body portion of the sheet metal;
   removing a portion of the circular section to form a plurality of teeth in the circular section; and
   attaching the circular section to an annular plate.

10. The method of claim 9, wherein the step of attaching the circular section to the annular plate includes welding the circular section to the annular plate.

11. The method of claim 10, wherein the step of forming the annular separator plate from the sheet metal by removing the circular section includes stamping the sheet metal to cut the circular section from the center of the separator plate main body portion.

12. The method of claim 11, wherein the step of removing the portion of the circular section to form the plurality of teeth in the circular section includes removing an inner portion of the circular section to form the circular section into an annulus having the plurality of teeth extending inwardly from an inner edge of the circular section.

13. The method of claim 10, wherein the step of removing the portion of the circular section to form the plurality of teeth in the circular section includes removing an outer portion of the circular section to form the plurality of teeth around an outer periphery of the circular section.

14. The method of claim 13, further comprising removing an inner portion of the circular section to form the circular section into an annulus.

15. The method of claim 12, further comprising removing an outer annular portion of the circular section to reduce the diameter of the circular section.

16. The method of claim 15, further comprising attaching friction material to the annular plate.

17. The method of claim 16, further comprising forming a plurality of separator teeth in the separator plate main body portion by removing material from an outer periphery of the separator plate main body portion.

\* \* \* \* \*